(12) United States Patent
Krishnamachari

(10) Patent No.: US 9,933,686 B2
(45) Date of Patent: Apr. 3, 2018

(54) SCANNING MICROSCOPE AND ACOUSTO-OPTICAL MAIN BEAM SPLITTER FOR A SCANNING MICROSCOPE

(71) Applicant: LEICA MICROSYSTEMS CMS GMBH, Wetzlar (DE)

(72) Inventor: Vishnu Vardhan Krishnamachari, Seeheim-Jugenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 14/916,520

(22) PCT Filed: Sep. 3, 2014

(86) PCT No.: PCT/EP2014/068749
§ 371 (c)(1),
(2) Date: Mar. 3, 2016

(87) PCT Pub. No.: WO2015/032821
PCT Pub. Date: Mar. 12, 2015

(65) Prior Publication Data
US 2016/0223882 A1 Aug. 4, 2016

(30) Foreign Application Priority Data

Sep. 3, 2013 (DE) .................. 10 2013 217 496
Dec. 23, 2013 (DE) .................. 10 2013 227 104

(51) Int. Cl.
*G02F 1/33* (2006.01)
*G01J 3/12* (2006.01)
(Continued)

(52) U.S. Cl.
CPC .............. *G02F 1/33* (2013.01); *G01J 3/1256* (2013.01); *G02B 21/0032* (2013.01);
(Continued)

(58) Field of Classification Search
CPC ..... G02F 1/11; G02F 1/33; G02F 1/00; G02F 1/01; G02B 21/0032; G02B 27/106
(Continued)

(56) References Cited

U.S. PATENT DOCUMENTS 6,525,812 B1 2/2003 Hartmann et al.
8,064,121 B2 11/2011 Seyfried
(Continued)

FOREIGN PATENT DOCUMENTS

DE 199906757 A1 12/1999
WO 0039545 A1 7/2000

*Primary Examiner* — Mahidere Sahle
(74) *Attorney, Agent, or Firm* — Hodgson Russ LLP

(57) ABSTRACT

The invention relates to an acousto-optic main beam splitter for a scanning microscope, which is embodied and intended to direct illuminating light having a preselected or preselectable illuminating light wavelength into an illumination beam path for illumination of a sample, and to direct detected light coming from a sample into a detection beam path. The acousto-optic main beam splitter is characterized in that a mechanical wave having an acoustic frequency associated with the illuminating light wavelength propagates, or multiple mechanical waves that have the same acoustic frequency associated with the illuminating light wavelength propagate, in the acousto-optic main beam splitter, both a portion of the detected light bundle having the illuminating light wavelength and a first linear polarization direction, and a portion of the detected light having the illuminating light wavelength and a second linear polarization direction perpendicular to the first linear polarization direction, being deflected out of the detected light bundle coming from a sample by interaction with the one mechanical wave or by interaction with the mechanical waves, and are thereby removed from the detected light bundle; and/or the acousto-optic main beam splitter being embodied to direct, by interaction with the one mechanical wave or by
(Continued)

interaction with the mechanical waves, both the portion of illuminating light that has the preselected illuminating light wavelength and a first linear polarization direction, and the portion of illuminating light that has the preselected illuminating light wavelength and a second linear polarization direction that is different from, in particular perpendicular to, the first linear polarization direction, into an illumination beam path for illumination of a sample.

20 Claims, 7 Drawing Sheets

(51) Int. Cl.
    *G02B 21/00*     (2006.01)
    *G02B 27/28*     (2006.01)
    *G02F 1/11*     (2006.01)

(52) U.S. Cl.
    CPC ..... *G02B 21/0064* (2013.01); *G02B 21/0068* (2013.01); *G02B 27/283* (2013.01); *G02F 1/116* (2013.01)

(58) Field of Classification Search
    USPC .................................. 359/285–287, 305–314
    See application file for complete search history.

(56) References Cited

U.S. PATENT DOCUMENTS

2003/0107732 A1     6/2003   Sasaki et al.
2004/0174585 A1     9/2004   Birk

SCANNING MICROSCOPE AND ACOUSTO-OPTICAL MAIN BEAM SPLITTER FOR A SCANNING MICROSCOPE

The invention relates to an acousto-optic main beam splitter for a scanning microscope, which is embodied and intended to direct illuminating light having a preselected or preselectable illuminating light wavelength into an illumination beam path for illumination of a sample, and to direct detected light coming from a sample into a detection beam path.

In scanning microscopy, a sample is illuminated with a light beam in order to observe the reflected or fluorescent light emitted from the sample. The focus of an illuminating light beam is moved in a specimen plane with the aid of a controllable beam deflection device, generally by tilting two mirrors; the deflection axes are usually perpendicular to one another, so that one mirror deflects in an X direction and the other in a Y direction. Tilting of the mirrors is brought about, for example, with the aid of galvanometer positioning elements. The power level of the light coming from the specimen is measured as a function of the position of the scanning beam. The positioning elements are usually equipped with sensors for ascertaining the current mirror position.

In confocal scanning microscopy in particular, a specimen is scanned in three dimensions with the focus of a light beam. A confocal scanning microscope generally encompasses a light source, a focusing optical system with which the light of the source is focused onto an aperture (called the "excitation pinhole"), a beam splitter, a beam deflection device for beam control, a microscope optical system, a detection pinhole, and the detectors for detecting the detected light or fluorescent light. The illuminating light is coupled in, for example, via a beam splitter.

The fluorescent light coming from the specimen travels via the beam deflection device back to the beam splitter, passes through the latter, and is then focused onto the detection pinhole behind which the detectors are located. Detected light that does not derive directly from the focus region takes a different light path and does not pass through the detection pinhole, so that a spot information item is obtained which results, by sequential scanning of the specimen, in a three-dimensional image.

In fluorescence microscopy the portions of illuminating light reflected at the sample and scattered at the sample must be removed from the detected light so that exclusively the fluorescent light can be detected. In a conventional microscope a dichroic filter, constituting a so-called "main beam splitter," is used for this purpose.

Instead of such a beam splitter, an optical arrangement configured as an acousto-optic component can also be provided in order to couple the excitation light of at least one light source into the microscope and to block the excitation light or excitation wavelength, scattered and reflected at the specimen, out of the light coming from the specimen via the detection beam path; this is known, for example, from German Application DE 199 06 757 A1. The optical arrangement known from this document is characterized, for variable configuration with a very simple design, in that excitation light having a different wavelength can be blocked out by the spectrally selective element. Alternatively, an optical arrangement of this kind is characterized in that the spectrally selective element is adjustable to the excitation wavelength that is to be blocked out.

The manner of operation of an acousto-optic component of this kind is based substantially on the interaction of the illuminating light with a mechanical wave; with some acousto-optic components, for example an AOTF, the mechanical wave must have a very specific frequency so that the Bragg condition is exactly satisfied for the light having the desired illuminating light wavelength. With these acousto-optic components, light for which the Bragg condition is not satisfied is not deflected by the mechanical wave. If light having multiple wavelengths is to be used as illuminating light for illumination of the sample, multiple mechanical waves having different frequencies must therefore also be generated simultaneously.

Acousto-optic components are generally made up of a so-called acousto-optic crystal, on which is mounted an electrical converter (often referred to in the literature as a "transducer"). The converter usually encompasses a piezoelectric material as well as one electrode located above it and one located below it. Electrical activation of the electrodes with radio frequencies, which are typically in the region between 30 MHz and 800 MHz, causes the piezoelectric material to vibrate, so that an acoustic wave (i.e. a sound wave) can occur and, once produced, passes through the crystal. After passing through an optical interaction region, the acoustic wave is usually absorbed at the oppositely located side of the crystal or reflected in a direction different from the incidence direction, so that the light is no longer influenced.

Acousto-optic crystals are notable for the fact that the resulting sound wave modifies the optical properties of the crystal, a kind of optical grating or comparable optically active structure, for example a hologram, being induced by the sound. Light passing through the crystal experiences a diffraction at the optical grating. The light is correspondingly directed into various diffraction orders in diffraction directions. There are acousto-optic components that influence all of the incident light more or less irrespective of wavelength. Reference may be made, solely by way of example, to components such as acousto-optic modulators (AOMs), acousto-optic deflectors (AODs), and frequency shifters.

Components moreover also already exist that, for example, act selectively on individual wavelengths as a function of the irradiated radio frequency (AOTFs). The acousto-optic elements are often made of birefringent crystals, for example tellurium oxide; the optical effect of the respective element is determined in particular by the location of the crystal axis relative to the incidence direction of the light and its polarization. These correlations are known, for example, from DE 10 2006 053 187 A1.

The manner of operation of a scanning microscope that comprises an acousto-optic component as a main beam splitter is described in detail in DE 101 37 155 A1. Also described therein is the fact that the mechanical wave, deflecting the tangentially polarized illuminating light, of a first AOTF can completely remove from the detected light exclusively those portions having the illuminating light wavelength and having a tangential linear polarization direction. The detected light comprises, however, portions having both a sagittal polarization direction and a tangential polarization direction.

The acousto-optic component is therefore followed by a compensation element that is embodied as a further acousto-optic component. The further acousto-optic component is likewise embodied as an AOTF and has control applied to it by a further high-frequency source using a further electromagnetic high-frequency wave having another frequency. The HF frequency of the further electromagnetic high-frequency wave is selected so that those portions of the detected light which have the wavelength of the illuminating light and a sagittal polarization direction are blocked out. This procedure is necessary because for the light having a sagittal polarization direction which is to be blocked out of the detected light, the Bragg condition for diffraction at a mechanical wave is satisfied only if the mechanical wave has a frequency other than the one for the light having a tangential polarization direction. The microscope must thus furnish, for each illuminating light wavelength, two different HF frequencies for simultaneous generation of two mechanical waves having different frequencies. A further acousto-optic component having a further acoustic generator is furthermore obligatorily necessary. If illumination using illuminating light having four wavelengths is to be effected, for example, fluorescent light detection is possible only if eight electromagnetic high-frequency waves are simultaneously furnished and if eight mechanical waves having different frequencies, distributed over two acousto-optic components, are generated therefrom.

One very serious problem is that obtrusive stripes of unknown cause, which are not observed when conventional, dichroic main beam splitters are used, often occur in the image of a scanning microscope.

The object of the present invention is therefore to describe an acousto-optic main beam splitter during whose use the obtrusive stripes do not occur.

The object is achieved by an acousto-optic main beam splitter which is characterized in that a mechanical wave having an acoustic frequency associated with the illuminating light wavelength propagates, or multiple mechanical waves that have the same acoustic frequency associated with the illuminating light wavelength propagate, in the acousto-optic main beam splitter, a. both a portion of the detected light bundle having the illuminating light wavelength and a first linear polarization direction, and a portion of the detected light having the illuminating light wavelength and a second linear polarization direction perpendicular to the first linear polarization direction, are deflected out of the detected light bundle coming from a sample by interaction with the one mechanical wave or by interaction with the mechanical waves, and are thereby removed from the detected light bundle; and/or b. the acousto-optic main beam splitter is embodied to direct, by interaction with the one mechanical wave or by interaction with the mechanical waves, both the portion of illuminating light that has the preselected illuminating light wavelength and a first linear polarization direction, and the portion of illuminating light that has the preselected illuminating light wavelength and a second linear polarization direction that is different from, in particular perpendicular to, the first linear polarization direction, into an illumination beam path for illumination of a sample.

What has been recognized firstly in accordance with the present invention is that the obtrusive stripes in the image are attributable to a "beat" that occurs when the frequency ranges of the individual mechanical waves overlap, ultimately resulting in periodic fluctuations in the light power level of the light arriving at the sample and/or at the detector. This problem is based in particular on the fact that the mechanical waves by their nature cannot have an infinitesimally small, i.e. singular, acoustic frequency, but instead that a frequency range around a center frequency must always be present. The term "acoustic frequencies" will nevertheless be used in this Application for better readability, the center frequency being meant in each case.

Advantageously and in accordance with the present invention, the thermal power level introduced into the acousto-optic main beam splitter by the impingement of electromagnetic high-frequency waves is substantially less than with acousto-optic main beam splitters known from the existing art. Specifically, with the latter, due to the incoupling of two mechanical waves for each illuminating light wavelength a particularly high thermal power level is inputted into the crystal or crystals, which ultimately reduces diffraction efficiency and also, because of the unavoidable temperature fluctuations, causes the deflection directions and thus the light power levels of the light arriving at the sample and at the detector to fluctuate. All these disadvantages are avoided or at least substantially reduced in the context of the acousto-optic main beam splitter according to the present invention.

In the interest of better clarity an explanation will firstly be given below, in particular with reference to various exemplifying embodiments, as to how the acousto-optic main beam splitter according to the present invention functions when only light having a single illuminating light wavelength is coupled into an illumination beam path and/or only those portions which have the single illuminating light wavelength are to be removed from the detected light coming from the sample. As additionally explained below in detail, however, it is also possible to apply the principle on which the invention is based simultaneously and repeatedly in the same arrangement, if illuminating light having multiple illuminating light wavelengths is to be deflected simultaneously into an illumination beam path and/or or if the portions having multiple illuminating light wavelengths are to be removed simultaneously from the detected light coming from the sample, at least one separate mechanical wave, respectively having an acoustic frequency specific for the illuminating light wavelength, being necessary for each of the illuminating light wavelengths.

The acousto-optic main beam splitter according to the present invention furthermore has the advantage that light having another wavelength or other wavelengths can be deflected by simply respectively modifying the acoustic frequency or acoustic frequencies, so that a microscope equipped with the acousto-optic main beam splitter is very individually usable.

An essential idea underlying the invention, namely the idea of directing, into an illumination beam path or a detection beam path, illuminating light and/or detected light having a predetermined or predeterminable wavelength, irrespective of its polarization, using a single acoustic frequency associated with the wavelength, can be implemented in various ways.

For example, it is possible to use a single crystal in which the mechanical wave having the associated acoustic frequency propagates, and to deflect the light having the predetermined wavelength irrespective of its polarization. It is also possible, however, to use multiple, in particular two, crystals in the acousto-optic main beam splitter. Some of the possible variant embodiments are explained below by way of example.

In an embodiment that can be realized particularly simply, two crystals are present, in each of which one mechanical wave propagates; the mechanical waves have the same acoustic frequency but the crystals are different and coordinated with one another, in terms of other parameters such as crystal cut and/or crystal orientation and/or propagation directions of the mechanical wave and of the light, in such a way that light having the predetermined wavelength with a first linear polarization direction is deflected in the first of the two crystals, while light having the predetermined wavelength with a second linear polarization direction, in particular perpendicular to the first linear polarization direction, is deflected in the second of the two crystals.

In an acousto-optic main beam splitter of this kind having such an arrangement of crystals, multiple inputs for coupling illuminating light into an illuminating light beam path can advantageously be furnished. In particular, advantageously, illuminating light having a different linear polarization direction can be coupled in and directed into an illumination beam path. It is also possible, however, for the acousto-optic main beam splitter to be embodied to receive unpolarized primary light and to direct at least portions having or more specific wavelengths, optionally via different inputs of a crystal or different inputs of multiple crystals, into an illumination beam path for illumination of a sample. An acousto-optic main beam splitter of this kind can comprise, for example, a polarizing beam splitter that receives the unpolarized primary light and divides it spatially as a function of the linear polarization direction, so that the resulting illuminating light ray bundles can be exposed, via different inputs of a crystal or of multiple crystals, to the action of the mechanical wave or to the action of the mechanical waves.

In a particular embodiment the acousto-optic main beam splitter comprises a first and a second crystal which are arranged in such a way that they are traversed successively by the detected light bundle. The portion having the illuminating light wavelength and the first linear polarization direction is deflected by interaction with a first mechanical wave that has the acoustic frequency and is present in the first crystal, and is thereby removed from the detected light bundle. The portion having the illuminating light wavelength and the second linear polarization direction is deflected by interaction with a second mechanical wave present in the second crystal, which wave likewise has the acoustic frequency, and is thereby removed from the detected light bundle.

Such an embodiment has the very particular advantage that at least one of the crystals can be a commercially usual crystal as utilized, for example, for acousto-optic tunable filters (AOTFs). Preferably the other crystal is then embodied in terms of other parameters in such a way that its mechanical wave, which has the same acoustic frequency as that of the first crystal, acts on the light having the same wavelength but another linear polarization direction.

Irrespective of whether the first crystal is a commercially usual crystal or a specially produced crystal, provision can advantageously be made, in particular, that the first crystal differs from the second crystal in terms of shape and/or size and/or crystal cut. Alternatively or additionally, provision can also be made that the orientation of the propagation direction of the detected light bundle relative to the lattice structure of the first crystal is different from the orientation of the propagation direction of the detected light bundle relative to the lattice structure of the second crystal, and/or that the orientation of the propagation direction of the first mechanical wave relative to the lattice structure of the first crystal is different from the orientation of the propagation direction of the second mechanical wave relative to the lattice structure of the second crystal.

In a particular embodiment in which the acousto-optic main beam splitter comprises two crystals, provision can advantageously be made that the detected light bundle passes firstly through the first and then through the second crystal; and that by interaction with the mechanical wave of the first crystal, illuminating light having the illuminating light wavelength is directed into an illumination beam path. Alternatively or additionally, provision can also be made that the detected light bundle passes firstly through the first and then through the second crystal; and that by interaction with the mechanical wave of the second crystal, illuminating light having the illuminating light wavelength is directed into an illumination beam path.

Multiple inputs for coupling illuminating light into an illumination beam path can advantageously also be furnished in an acousto-optic main beam splitter of this kind having such an arrangement of crystals. In particular, advantageously, illuminating light having a different linear polarization direction can be coupled in and directed into an illumination beam path. With an embodiment of this kind as well, the acousto-optic main beam splitter can be embodied to receive unpolarized primary light and to direct at least portions having one or more specific wavelengths, optionally via different inputs of a crystal or of multiple crystals, into an illumination beam path for illumination of a sample. In particular, an acousto-optic main beam splitter of this kind can also, for example, comprise a polarizing beam splitter that receives the unpolarized primary light and spatially divides it as a function of the linear polarization direction, so that the resulting illuminating light beam bundles can be exposed, via different inputs of a crystal or of multiple crystals, to the action of the mechanical wave or to the action of the mechanical waves.

Alternatively to the embodiments described above, it is also possible for the acousto-optic main beam splitter to comprise only a single crystal, in which a mechanical wave that has an acoustic frequency associated with the preselected wavelength of the light propagates.

Such an embodiment is preferably configured in such a way that the crystal and the propagation direction of the mechanical wave are oriented, relative to one another and respectively relative to the detected light bundle incident into the crystal, in such a way that the acousto-optic main beam splitter deflects, with the mechanical wave, both the portion of the detected light bundle having the illumination wavelength and a first linear polarization direction, and the portion of the detected light bundle having the illumination wavelength and a second linear polarization direction perpendicular to the first linear polarization direction, and thereby removes them from the detected light bundle.

Provision can be made in particular that in the crystal, detected light having a first linear polarization direction is deflected in a first direction while the detected light having a second linear polarization direction, in particular perpendicular to the first linear polarization direction, is deflected in another, second direction. Alternatively or additionally it is also possible that illuminating light having a first linear polarization direction can be coupled into a first input of the acousto-optic main beam splitter, while light having a second linear polarization direction can be coupled into a second input of the acousto-optic main beam splitter.

Irrespective of the specific embodiment of the acousto-optic beam splitter, but in particular in the context of an acousto-optic beam splitter in which a mechanical wave acts on the light components having an illuminating light wavelength and both linear polarization directions, provision can advantageously be made that the beam-guiding components of the main beam splitter are arranged and embodied in such a way that the remaining part of the detected light bundle leaves the acousto-optic main beam splitter collinearly; and/or that all illuminating light bundles having the desired wavelength, irrespective of their polarization direction, are collinearly combined in the illuminating light beam path into which they have been directed.

The specific configuration of an acousto-optic main beam splitter of this kind, in particular the orientation of the crystal relative to the propagation direction of the mechanical wave(s) and to the propagation direction of the detected light bundle, and the orientation of the mechanical wave(s) and the detected light bundles relative to one another, as well as the orientation of the entrance and exit surfaces with respect to one another and to the optical axis of the crystal, can be developed, for example—in particular for an embodiment in which the divided-off illuminating light leaves the acousto-optic main beam splitter and/or the crystal as a collinear illuminating light bundle—in accordance with the iterative method discussed below; preferably the method is pursued not on the basis of real components (although that would also be possible) but instead in a computer simulation, until the individual parameters of crystal shape, orientation of the surfaces and of the crystal lattice, orientation of the propagation direction of the mechanical wave(s), and propagation directions of the detected light and/or illuminating light, conform to the desired requirements. When all the relevant parameters have been ascertained in this manner in a computer simulation, the crystal can then be manufactured in a further step.

Firstly an acousto-optic component, for example a commercially usual AOTF, having a known, usual crystal cut and a known orientation, is introduced into the beam path of a microscope in such a way that the detected light bundle encounters the entrance surface of the crystal at an incidence angle of 90 degrees. The crystal is then rotated, preferably in the plane that is spanned by the incident detected light bundle and the propagation direction of the mechanical wave, and the angle between the propagation direction of the mechanical wave and the crystal axes is thus also modified, until both linear polarization portions of the illuminating light wavelength(s) are deflected, with the mechanical wave (s), out of the detected light bundle and are thereby removed from the detected light bundle.

The result of the rotation is generally, however, that the collinearity of the emerging detected light is lost. For this reason, in a next iteration step the shape of the crystal is modified—without rotating the crystal—in such way that the entrance surface is once again perpendicular to the incident detected light bundle. In a further step, the exit surface for the detected light is oriented—without rotating the crystal but by modifying the crystal shape—so that the detected light leaves the crystal as a collinear detected light bundle.

The result of the changes in the crystal shape is generally, however, that both linear polarization portions of the illuminating light wavelength(s) can no longer each be deflected with the mechanical wave and thereby removed from the detected light bundle. For this reason, the crystal is then rotated again until this condition is again satisfied. The further iteration steps already described are then repeated.

A sufficient number of iteration cycles are carried out until the condition of simultaneous deflection of both linear polarization portions, and the condition of collinear light exit, are satisfied. As a rule the method converges very quickly, so that the goal is reached after a few iteration cycles.

In a particular embodiment, care is respectively taken upon rotation of the crystal that with respect to one of the linear polarization directions of the detected light, all of the light that is diffracted into the first order, and that has the illuminating light wavelengths, exits the crystal collinearly.

Such an embodiment has the advantage not only that both portions having a different linear polarization can respectively be removed from the detected light bundle with a single mechanical wave, but also that multi-colored illuminating light can additionally be diffracted collinearly into the illuminating light beam path via the light path of the first diffraction order, for which the above-described collinearity exists.

As has already been explained above, it is possible for the acousto-optic main beam splitter to comprise only a single crystal in which a mechanical wave that has an acoustic frequency associated with the preselected wavelength of the light, and that acts on light having the preselected wavelength irrespective of its polarization, propagates.

In a particular embodiment of an acousto-optic main beam splitter according to the present invention, two such crystals are arranged successively so that they are traversed sequentially by the detected light to be detected. An embodiment of this kind offers very good efficiency in terms of removal, from the detected light coming from the sample, of the light portions that have the illuminating light wavelength or illuminating light wavelengths. Such an embodiment furthermore advantageously offers additional incoupling possibilities for coupling further illuminating light bundles into an illumination beam path of a microscope. Such an arrangement having multiple crystals makes possible in particular the simultaneous coupling of multiple illuminating light bundles into an illuminating light beam path of a microscope.

In this context it is also possible in particular for there to propagate, both in the first crystal and in the second crystal of such an arrangement, a respective mechanical wave that deflects light having the predetermined wavelength irrespective of its polarization, such that the acoustic frequencies of the mechanical waves propagating in the crystals can also be different. It is indeed also possible for the construction of the successively arranged acousto-optic components, in particular the construction and orientation of the crystals, to differ so that the mechanical wave propagating in the first crystal acts with its acoustic frequency, and the mechanical wave propagating in the second crystal acts with its different acoustic frequency (in each case irrespective of polarization), on the light having the illuminating light wavelength.

As already mentioned, provision can advantageously be made that the beam-guiding components of the main beam splitter are arranged and embodied in such a way that the remaining part of the detected light bundle leaves the acousto-optic main beam splitter collinearly.

The acousto-optic main beam splitter can advantageously be embodied in such a way that the first linear polarization direction is the linear polarization direction of the ordinary light with respect to a birefringence property of the crystal. Alternatively or additionally, provision can be made that the second linear polarization direction is the linear polarization direction of the extraordinary light with respect to a birefringence property of the crystal; and/or that the first or the second linear polarization direction is arranged in the plane that is spanned by the propagation direction of the mechanical wave and the propagation direction of the detected light bundle.

Advantageously in accordance with the present invention, the acousto-optic main beam splitter can be embodied in such a way that it offers a plurality of possibilities for illuminating a sample, in particular for directing multiple different illuminating light bundles into an illumination beam path of a microscope. In particular, provision can advantageously be made that the acousto-optic main beam splitter comprises multiple inputs for coupling in multiple primary light bundles, from which illuminating light having a predefined or predefinable wavelength, or illuminating light having multiple predefined or predefinable wavelengths, can be divided off and directed into an illumination beam path.

In a particular embodiment, for example, provision is made that the acousto-optic main beam splitter comprises a first and a second crystal which are arranged, in particular, in such a way that they are traversed successively by the detected light bundle, illuminating light that has the illuminating light wavelength and a first linear polarization direction being deflected into the illumination beam path for illumination of a sample by interaction with a first mechanical wave that has the acoustic frequency and is present in the first crystal; and illuminating light that has the illuminating light wavelength and a second linear polarization direction, different from the first linear polarization direction, being deflected into the illumination beam path for illumination of a sample by interaction with a second mechanical wave that has the acoustic frequency and is present in the second crystal.

Alternatively, provision can also be made that the acousto-optic main beam splitter is embodied to respectively divide off, by interaction with the mechanical wave propagating in the one crystal, both from a first polychromatic and preferably collinear primary light bundle having a first linear polarization direction and from a second polychromatic and preferably collinear primary light bundle having a second linear polarization direction different from the first linear polarization direction, in particular perpendicular thereto, illuminating light having the illuminating light wavelength associated with the frequency of the mechanical wave and to direct it into an illumination beam path for illumination of a sample; or that the acousto-optic main beam splitter is embodied to direct, by interaction with the mechanical wave propagating in a crystal, both illuminating light that has the illuminating light wavelength and a first linear polarization direction, and illuminating light that has the illuminating light wavelength and a second, other, in particular perpendicular linear polarization direction, into the illumination beam path for illumination of a sample.

With the aid of the main beam splitter according to the present invention, different illuminating light components that can differ in terms of wavelength and/or polarization can be directed into the illumination beam path for illumination of a sample in order to bring about particular, in particular resolution-increasing, effects. The main beam splitter according to the present invention can advantageously be used in particular in the sector of stimulated emission depletion (STED) microscopy or in the sector of coherent anti-Stokes Raman spectroscopy (CARS) microscopy or in the sector of stimulated Raman scattering (SRS) microscopy or in the sector of coherent Stokes Raman scattering (CSRS) microscopy or in the sector of Raman-induced Kerr effect scattering (RIKES) microscopy.

As already mentioned, the acousto-optic main beam splitter is not limited only to deflecting light having a single wavelength. Provision can instead be made that the acousto-optic main beam splitter removes from the detected light bundle, with multiple mechanical waves that are respectively characterized by different acoustic frequencies, portions of illuminating light that is scattered and/or reflected at a sample and has multiple illuminating light wavelengths associated with the acoustic frequencies.

In a particular embodiment provision is made that the acousto-optic main beam splitter comprises a first and a second crystal, such that portions of illuminating light that is scattered and/or reflected at a sample and has a first linear polarization direction, and has multiple illuminating light wavelengths associated with the acoustic frequencies, are simultaneously deflected out of the detected light bundle in the first crystal with multiple mechanical waves that are each characterized by different acoustic frequencies associated with different illuminating light wavelengths; and such that portions of illuminating light that is scattered and/or reflected at a sample and has illuminating light wavelengths associated with the acoustic frequencies, and has a second linear polarization direction different from the first linear polarization direction, are simultaneously deflected out of the detected light bundle in the second crystal with multiple mechanical waves that have the same acoustic frequencies as the mechanical waves of the first crystal.

With respect to multi-color applications provision can advantageously be made, as already mentioned, that multiple mechanical waves that are each characterized by different acoustic frequencies associated with different illuminating light wavelengths propagate simultaneously in the main beam splitter, in particular in a crystal of the main beam splitter, each of the mechanical waves respectively deflecting both the portion having the illuminating light wavelength associated with its frequency and having a first linear polarization direction, and the portion having a second linear polarization direction perpendicular to the first linear polarization direction, and thereby removing them from the detected light bundle.

Provision can be made here in particular that the mechanical waves have the same propagation direction and/or are generated by the same acoustic generator. The acoustic generator is preferably mounted on an outer surface of the crystal, the propagation direction of the mechanical wave relative to the crystal and its lattice structure being determined by the orientation of that outer surface relative to the crystal body, which is definable by the crystal cut.

Provision can advantageously also be made that with the multiple mechanical waves the acousto-optic main beam splitter divides off, from polychromatic primary light of at least one light source, illuminating light having multiple illuminating light wavelengths and directs it into an illumination beam path for illumination of a sample. Provision can be made in particular that with the multiple mechanical waves the acousto-optic main beam splitter divides off, from a polychromatic and preferably collinear primary light bundle, illuminating light of multiple illuminating light wavelengths and directs it into an illumination beam path for illumination of a sample.

As already described above with reference to a mechanical wave, provision can advantageously be made that with multiple mechanical waves that have different acoustic frequencies the acousto-optic main beam splitter respectively divides off, both from a first polychromatic and preferably collinear primary light bundle of at least one light source having a first linear polarization direction, and from a second polychromatic and preferably collinear primary light bundle of at least one light source having a second linear polarization direction perpendicular to the first linear polarization direction, illuminating light having several wavelengths and directs it into an illumination beam path for illumination of a sample, the frequency of the respective mechanical wave being respectively associated with one of the illuminating light wavelengths.

In an embodiment that can be used in very particularly versatile fashion, provision is made that the acousto-optic main beam splitter and/or a crystal of the main beam splitter comprises a first input for a first primary light bundle having a first linear polarization direction, from which illuminating light having the preselected or preselectable wavelength can be divided off for illumination of a sample, and a second input for a second primary light bundle having a second, other, in particular perpendicular linear polarization direction, from which illuminating light having the preselected or preselectable wavelength can be divided off for illumination of a sample. Provision can advantageously be made in particular that the first primary light bundle and the second primary light bundle have been produced by spatial division of an unpolarized primary light bundle, for example of a white light source, using a polarizing beam splitter.

Provision can also be made that the acousto-optic main beam splitter comprises a polarizing beam splitter for spatial division of a primary light bundle, for example of a white light source that contains a photonic light-guiding fiber, into a first portion having a first linear polarization direction and a portion having a second, other, in particular perpendicular linear polarization direction.

As also already mentioned, provision can advantageously be made that the illuminating light directed into the illumination beam path leaves the acousto-optic main beam splitter and/or a crystal of the acousto-optic main beam splitter as a collinear illuminating light bundle. The acousto-optic main beam splitter can function in this regard as a beam combiner for illuminating light having the same wavelength but a different linear polarization. This embodiment has the advantage that the illuminating light can be focused onto or into the sample with a single objective and preferably with illumination of the entire objective pupil.

In a particular embodiment, a crystal of the acousto-optic main beam splitter through which the mechanical wave propagates comprises an entrance surface for the detected light; provision can be made in particular that the detected light is incident at an incidence angle of zero degrees.

Provision can also be made in particular, alternatively or additionally, that a crystal of the acousto-optic main beam splitter through which the mechanical wave propagates comprises an exit surface for the detected light; and/or that a crystal of the acousto-optic main beam splitter through which the mechanical wave propagates comprises an exit surface for the detected light through which the detected light leaves the crystal at a return angle of zero degrees.

In a particular embodiment a crystal of the acousto-optic main beam splitter through which the mechanical wave propagates comprises an entrance surface and an exit surface, oriented parallel thereto, for the detected light.

In a very particularly advantageous embodiment, a crystal of the acousto-optic main beam splitter comprises at least one entrance surface for the primary light of at least one light source. As already explained, the light source can advantageously be a light source that emits primary light having a broad spectrum, for example with the aid of a microstructured fiber and/or a PBG fiber, so that the respective light portions having the desired wavelengths can be directed into the illumination beam path of the microscope with the aid of the acousto-optic main beam splitter. The deflection of the desired illuminating light is preferably accomplished by diffraction at the mechanical wave (or mechanical waves, if light of multiple wavelengths is desired as illuminating light) into the first diffraction order, while the remaining light, with no interaction with the mechanical wave (or waves), travels to a beam trap.

In a particular embodiment provision is made that a crystal of the acousto-optic main beam splitter comprises at least one entrance surface for the primary light of at least one light source, which at the same time is the exit surface for the detected light.

Provision can also be made in particular that a crystal of the acousto-optic main beam splitter comprises an exit surface for the illuminating light which at the same time is the entrance surface for the detected light; and/or that a crystal of the acousto-optic main beam splitter comprises an entrance surface for primary light of at least one light source and an exit surface for the divided-off illuminating light, which are oriented with respect to one another in such a way that the illuminating light deflected with the mechanical wave encounters the exit surface at an incidence angle of zero degrees.

A particularly advantageous embodiment is one in which a crystal of the acousto-optic main beam splitter comprises an entrance surface for primary light of at least one light source and an exit surface for the divided-off illuminating light, which are oriented with respect to one another in such a way that the primary light is couplable into the crystal as a collinear primary light bundle, and the illuminating light deflected with the mechanical wave leaves the crystal as a collinear illuminating light bundle.

In order to achieve collinearity of the relevant light bundles, in an advantageous embodiment provision is made that the acousto-optic main beam splitter comprises at least one dispersive optical component that compensates for a spatial color division, produced (at least in part) by the crystal, of the primary light and/or of the illuminating light and/or of the detected light.

Alternatively or additionally, provision can also be made that the acousto-optic main beam splitter comprises at least one dispersive optical component that compensates for a spatial color division, produced (at least in part) by the crystal, of the primary light and/or of the illuminating light and/or of the detected light, and that has multiple entrance surfaces: in particular a first entrance surface for light having a first linear polarization direction and a second entrance surface for light having a second linear polarization direction perpendicular to the first linear polarization direction.

These embodiments have the particular advantage that the acousto-optic main beam splitter can be equipped with a crystal that can have a comparatively simple basic shape. Provision can be made, for example, that the entrance surface for the detected light is embodied to be parallel to the exit surface for the detected light. According to the present invention a spatial color division, by the crystal, of the primary light of a light source coupled in, for example, through the exit surface for the detected light can be compensated for, for example, by the fact that before the primary light encounters the crystal it is firstly spatially divided in an opposite direction, and that spatial division is undone again by the crystal.

Especially in the context of an embodiment of the acousto-optic main beam splitter in which two crystals are disposed serially in such a way that they are traversed successively by the detected light emerging from the sample, provision can advantageously be made, in order to achieve collinearity of the detected light leaving the acousto-optic main beam splitter, that the entrance window of the first crystal is arranged parallel to the exit window of the second crystal; and additionally that the exit window of the first crystal is arranged parallel to the entrance window of the second crystal.

In order to achieve collinearity, provision can alternatively or additionally also be made that the acousto-optic main beam splitter comprises at least one dispersive optical component that compensates for a spatial color division of the primary light and/or of the illuminating light and/or of the detected light produced (at least in part) by a crystal of the acousto-optic main beam splitter through which the mechanical wave propagates. It is also possible, alternatively or additionally, for the acousto-optic main beam splitter to comprise at least one dispersive optical component that compensates for a spatial color division, produced (at least in part) by the crystal of the acousto-optic main beam splitter through which the mechanical wave propagates, of the primary light and/or of the illuminating light and/or of the detected light, and that comprises multiple entrance surfaces; and/or for the acousto-optic main beam splitter to comprise at least one dispersive optical component that compensates for a spatial color division, produced (at least in part) by the crystal of the acousto-optic main beam splitter through which the mechanical wave propagates, of the primary light and/or of the illuminating light and/or of the detected light, and that comprises a first entrance surface for light having a first linear polarization direction and a second entrance surface for light having a second linear polarization direction perpendicular to the first linear polarization direction.

A scanning microscope, in particular a confocal scanning microscope, that is equipped with an acousto-optic main beam splitter according to the present invention is usable in particularly versatile fashion.

The subject matter of the invention is schematically depicted in the drawings and will be described below with reference to the Figures, identically functioning elements being labeled with the same reference characters. In the drawings:

FIG. 1 shows a microscope, embodied as a confocal scanning microscope, that is equipped with an acousto-optic main beam splitter according to the present invention.

Figure 1:
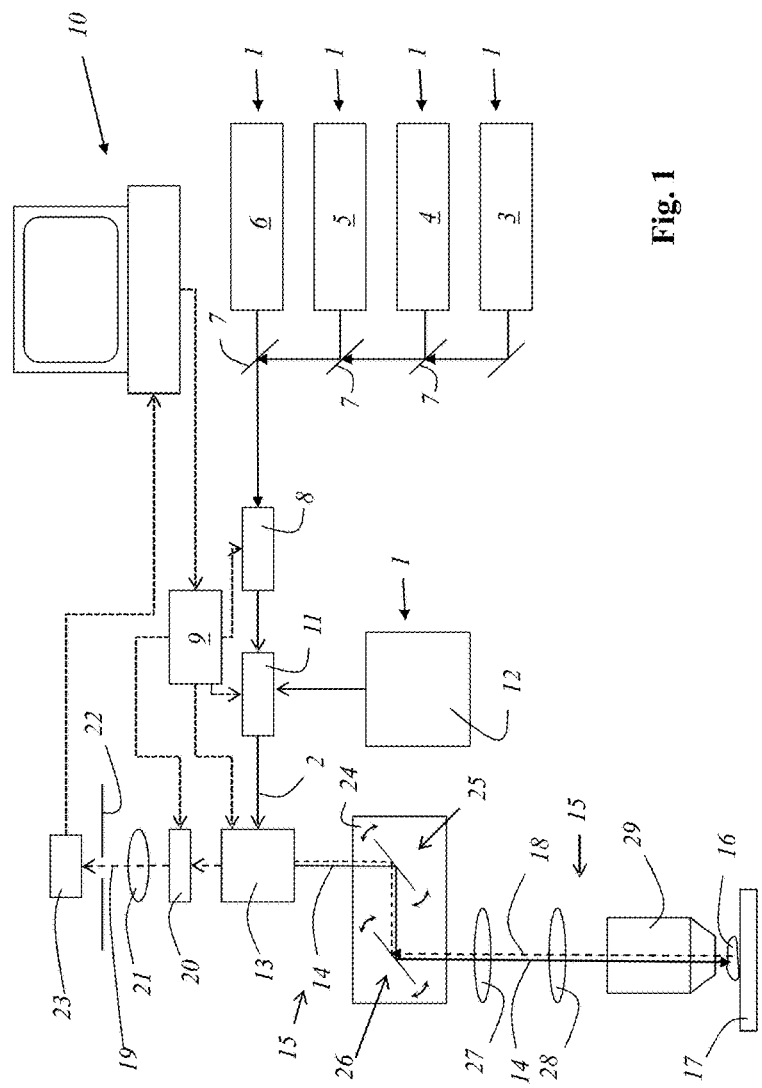
FIG. 1 shows an exemplifying embodiment of a microscope having an acousto-optic main beam splitter according to the present invention.

The microscope contains multiple light sources 1 whose light is combined into one collinear primary light bundle 2. Specifically, the microscope contains a diode laser 3, a (preferably diode-pumped) solid state laser 4 (DPSS laser), a helium-neon laser 5, and an argon ion laser 6, whose emitted light bundles are combined with the aid of dichroic beam splitters 7. The combined emitted light bundles then travel to an acousto-optic tunable filter (AOTF) 8 that allows light of specific wavelengths to be selected from the combined emitted light bundle and passed on. AOTF 8 is impinged upon for this purpose by electromagnetic high-frequency waves of a high-frequency source 9; the user can define, by input via a PC 10, which wavelength or wavelengths the passed-on light is to have, and the frequency of high-frequency source 9 is automatically adjusted accordingly by the microscope. Mechanical waves for diffracting the desired light are generated inside AOTF 8 with the aid of the electromagnetic high-frequency waves.

The microscope furthermore has an acousto-optic beam combiner 11 that receives on the one hand light passed on from AOTF 8, and on the other hand the light of a white light source 12.

A white light source 12 of this kind can comprise in particular a special optical element, for example a microstructured optical element and/or a tapered fiber and/or a photonic crystal fiber and/or a photonic crystal and/or a photonic band gap material and/or a comparable optical element inducing nonlinearities, which spectrally broadens the incident primary light, in particular the light of a pulsed laser. A light source of this kind can make available primary light having a spectral width of several 10 s of nm, in particular several 100 s of nm.

Acousto-optic beam combiner 11 is likewise impinged upon by electromagnetic high-frequency waves that are furnished by high-frequency source 9. Acousto-optic beam combiner 11 contains an acousto-optic element in which mechanical waves for deflecting or diffracting light rays can be generated with the electromagnetic high-frequency waves, in such a way that the light passed on from AOTF 8 and the light of white light source 12 leave acousto-optic beam combiner 11 collinearly with one another as a combined primary light bundle.

The microscope furthermore contains an acousto-optic main beam splitter 13 that has the task of directing illuminating light 14 having a desired wavelength, or illuminating light 14 having multiple desired wavelengths, into an illuminating light beam path 15, and on the other hand the task of removing, from the polychromatic and collinear detected light bundle 18 (shown with dashed lines) emerging from the illuminated sample 16 that is arranged on a specimen stage 17, the portions of illuminating light 15 scattered and/or reflected at sample 16.

Illuminating light 14 directed from acousto-optic main beam splitter 13 into illumination beam path 15 travels to a beam deflection device 24 that contains a first galvanometer mirror 25 and a second galvanometer mirror 26. The remaining part of primary light 2 is not influenced by the mechanical wave or waves, and travels into beam traps (not depicted).

After leaving beam deflection device 24, illuminating light 14 travels to scanning lens 27, then to tube lens 28 and lastly to an objective 29 that focuses illuminating light 14 onto or into sample 16.

Beam deflection device 24 guides the focus of illuminating light 14 preferably in a meander shape over or through sample 16. Galvanometer mirror 25 is responsible for deflection in an X direction, while second galvanometer mirror 26 is responsible for deflection in a Y direction.

Acousto-optic main beam splitter 13 is also impinged upon by at least one electromagnetic high-frequency wave in order to generate at least one mechanical wave having one frequency. The frequency of the mechanical wave can be modified by modifying the frequency of the electromagnetic high-frequency wave. The mechanical wave can be generated, for example, with the aid of a piezo acoustic generator.

A crystal (not depicted in this Figure) of acousto-optic main beam splitter 13 in which the mechanical wave propagates, and the propagation direction of the mechanical wave, are oriented with respect to detected light bundle 18 coming from sample 16 in such a way that acousto-optic main beam splitter 13 deflects, with the mechanical wave, both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly and, after passing through an acousto-optic notch filter (AONF) 20, an imaging optical system 21, and a detection pinhole 22, arrives at a detector 23 that is preferably embodied as a multi-band detector. The electrical signals of detector 23 are transferred to PC 10 for further processing and evaluation.

The microscope is configured in such a way that not only can light having one wavelength be directed as illuminating light 14 into illuminating light beam path 15, and not only can light having one wavelength be removed from detected light bundle 18 coming from sample 16, but instead multiple mechanical waves can be used simultaneously to remove illuminating light having multiple different wavelengths (and both linear polarization directions) from the detected light and/or to direct illuminating light having multiple different wavelengths (and both linear polarization directions) into the illuminating light beam path, although advantageously only a single mechanical wave is generated for each illuminating light wavelength in the crystal of acousto-optic main beam splitter 13.

Acousto-optic main beam splitter 13 is impinged upon, for each illuminating light wavelength desired by the user, by a separate electromagnetic high-frequency wave that is generated by high-frequency source 9. For the sake of completeness, it should be mentioned that the different high-frequency waves that high-frequency source 9 furnishes for AONF 20, for acousto-optic beam combiner 11, for AOTF 8, and for acousto-optic main beam splitter 13 as a rule have different frequencies. It is also possible, however, to embody the acousto-optic components in such a way that two high-frequency waves having the same frequency can be used for at least of two acousto-optic components.

Figure 2:
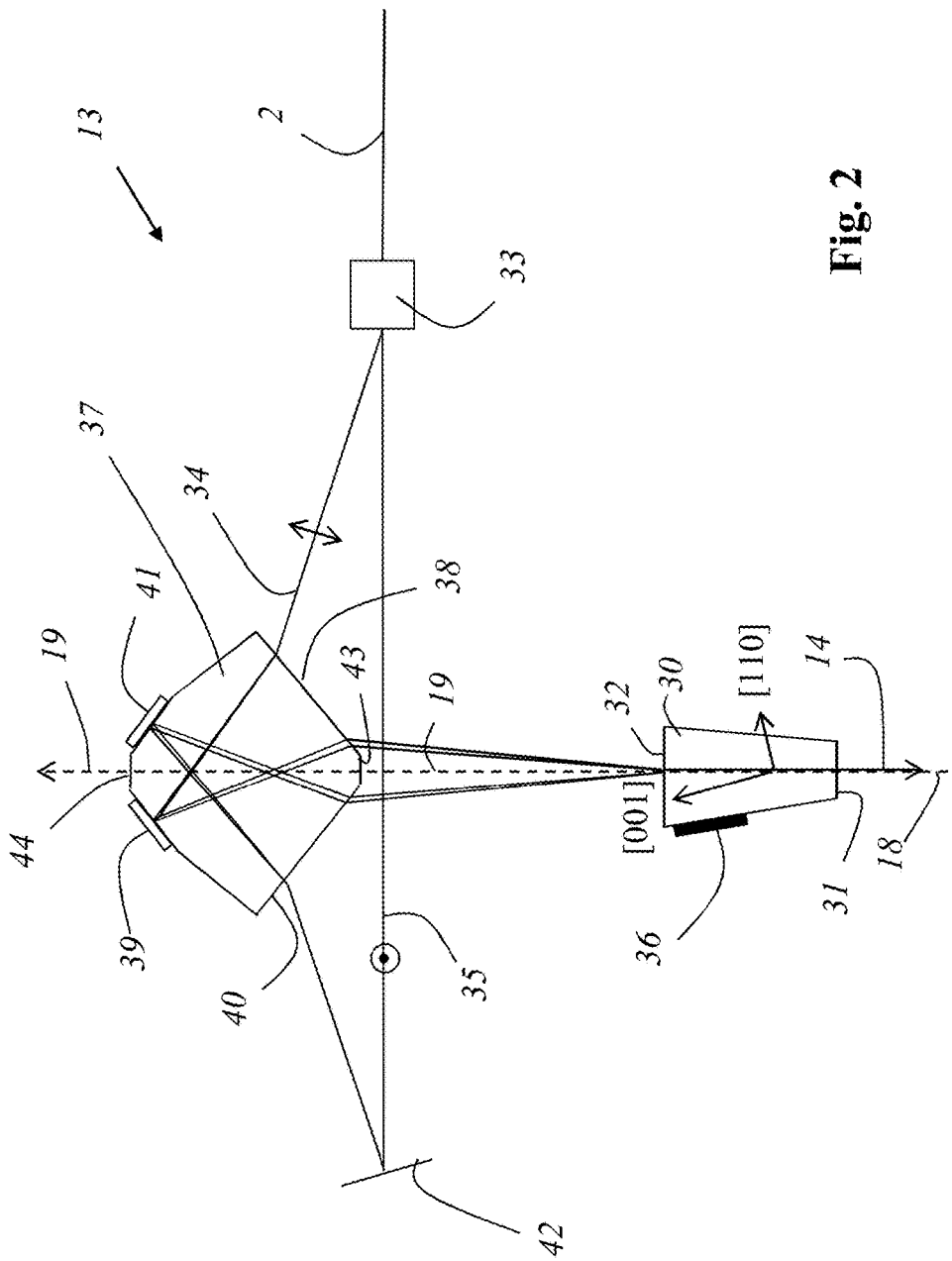
FIG. 2 shows an exemplifying embodiment of an acousto-optic main beam splitter according to the present invention.

FIG. 2 schematically shows an exemplifying embodiment of an acousto-optic main beam splitter 13.

Acousto-optic main beam splitter 13 contains a polarizing beam splitter 33 that receives unpolarized primary light having multiple wavelengths, in particular unpolarized broad-band primary light 2, for example of a white light source. Polarizing beam splitter 33 spatially divides primary light 2 into a first primary light bundle 34 and a second primary light bundle 35, the light of primary light bundles 34, 35 having mutually perpendicular linear polarization directions.

Acousto-optic main beam splitter 13 contains a crystal 30 having an entrance surface 31 for detected light bundle 18 (drawn with dashed lines) coming from a sample (not detected here) and having an exit surface 32 for remaining portion 19 of detected light bundle 18, which is ultimately directed to a detector (not illustrated here). Exit surface 32 for remaining portion 19 is at the same time the entrance surface for coupling first primary light bundle 34 and second primary light bundle 35 into crystal 30.

Arranged on crystal 30 is a piezo acoustic generator 36 that is impinged upon by an electromagnetic high-frequency wave having one frequency or by multiple electromagnetic high-frequency waves having multiple frequencies, in order to respectively generate a mechanical wave or multiple different mechanical waves. With the aid of the mechanical wave or multiple mechanical waves, the light portions having a desired illuminating light wavelength or the light portions having multiple desired illuminating light wavelengths can be respectively deflected by diffraction both out of first primary light bundle 34 and out of second primary light bundle 35, and thus directed collinearly into an illumination beam path 15, one of the illuminating light wavelengths being respectively associated (simultaneously for both linear polarization directions) with one frequency of the respective mechanical wave (in particular in order to satisfy the respective Bragg condition).

Illuminating light 14 leaves crystal 30 through entrance surface 31 for detected light bundle 18, which is thus simultaneously the exit surface for illuminating light 14.

At the same time, that light portion which has the wavelength or wavelengths of illuminating light 14 is removed from detected light bundle 18 (drawn with dashed lines) with the aid of the mechanical wave or waves, crystal 30 and the propagation direction of the mechanical wave(s) being oriented, with respect to detected light bundle 18 coming from sample 16, in such a way that each of the mechanical waves deflects both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly through exit surface 32. In the Figure, the orientation of the crystal structure is schematically indicated by labeling with the crystal axes [001] and [110].

First primary light bundle 34 is coupled into crystal 30 oppositely to the direction of the first diffraction order of the ordinary light (with respect to the diffracted portion of the detected light), while second primary light bundle 35 is coupled into crystal 30 oppositely to the direction of the first diffraction order of the extraordinary light (with respect to the diffracted portion of the detected light). All of the primary light 2 is thus available so that from that primary light 2, illuminating light 14 having a specific wavelength or specific wavelengths can be directed with the aid of the acousto-optic main beam splitter into the illuminating light beam path of the microscope and thus to the sample, only a single mechanical wave having a single frequency being necessary for each wavelength.

In order to achieve collinearity of illuminating light bundle 14 emerging from crystal 30, crystal 30 is preceded by a dispersive optical component 37 that spatially and spectrally divides first primary light bundle 34 and second primary light bundle 35, the degree of spatial division being defined (in particular by selection of the angles and/or of the optical path lengths) so that it is undone again by crystal 30.

Dispersive optical component 37 comprises an incoupling and outcoupling window 38 for first primary light bundle 34. First primary light bundle 34 firstly enters dispersive optical component 37 through incoupling and outcoupling window 38, and after passing through dispersive optical component 37 is reflected by a first mirror 39 that is mounted on a surface located oppositely from incoupling and outcoupling window 38, before first primary light bundle 34, having been spatially and spectrally divided, leaves dispersive optical component 37 again through incoupling and outcoupling window 38.

Dispersive optical component 37 analogously comprises a further incoupling and outcoupling window 40 for second primary light bundle 35 deflected by a deflection mirror 42. Second primary light bundle 35 firstly enters dispersive optical component 37 through further incoupling and outcoupling window 40, and after passing through dispersive optical component 37 is reflected by a second mirror 41 that is mounted on a surface located oppositely from further incoupling and outcoupling window 40, before second primary light bundle 35, having been spatially and spectrally divided, leaves dispersive optical component 37 again through further incoupling and outcoupling window 40.

Dispersive optical component 37 furthermore comprises an incoupling surface 43 and an outcoupling surface 44, parallel thereto, for remaining portion 19 of detected light bundle 18. Remaining portion 19 of detected light bundle 18 passes orthogonally both through incoupling surface 43 and through the parallel outcoupling surface 44, and therefore experiences no spectral division.

Figure 3:
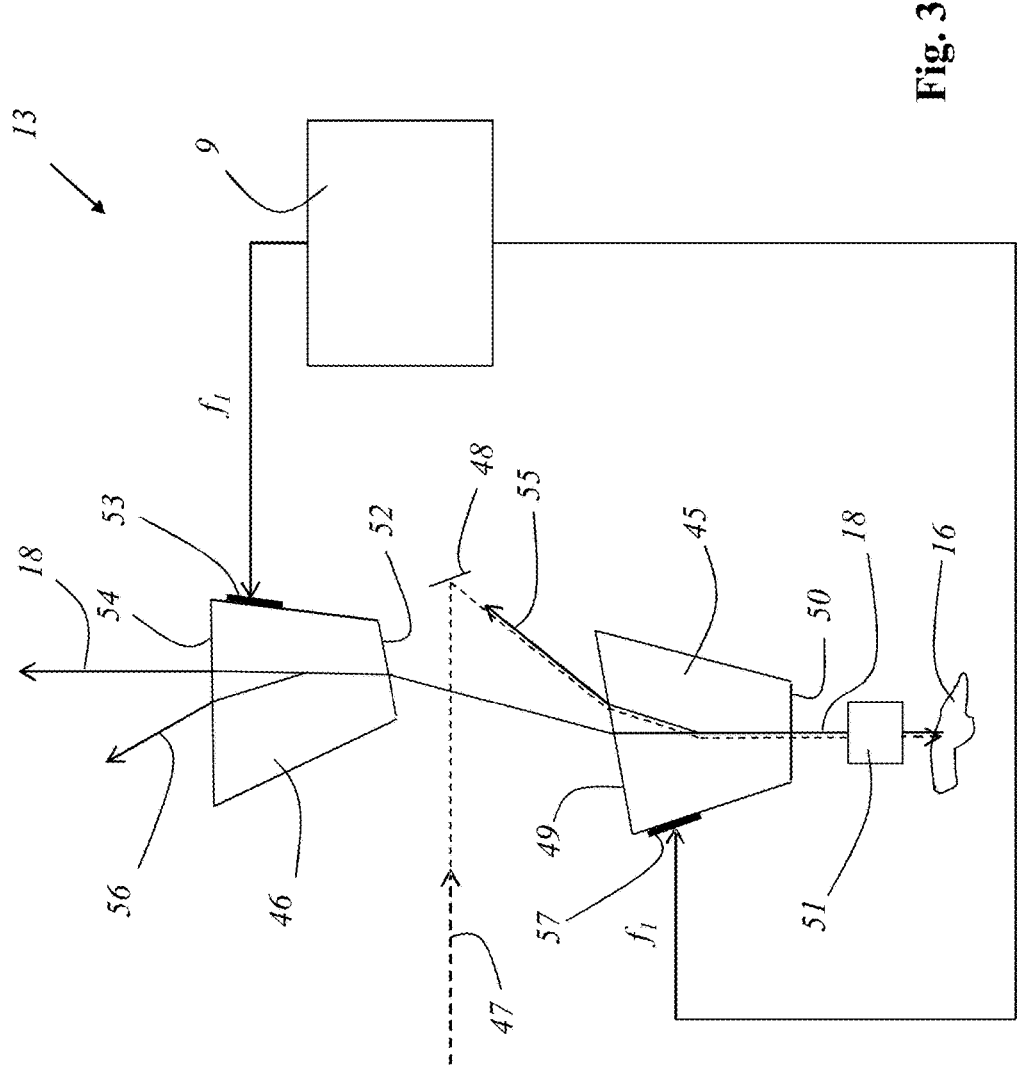
FIG. 3 shows a second exemplifying embodiment of an acousto-optic main beam splitter according to the present invention.

FIG. 3 shows a second exemplifying embodiment of an acousto-optic main beam splitter 13 according to the present invention, which comprises a first crystal 45 and a second crystal 46.

Acousto-optic main beam splitter 13 that is depicted receives a first primary light bundle 47 of a light source (not depicted), which contains light having multiple wavelengths. The primary light bundle is deflected with the aid of a mirror 48 toward first crystal 45, and enters the latter through an exit window 49. In the interest of clarity, it should be mentioned that the term "exit window" was selected arbitrarily, since the detected light coming from the sample exits from first crystal 45 through this window; this is described in further detail below.

Arranged on first crystal 45 is a first piezo acoustic generator 57 that is impinged upon by an electromagnetic high-frequency wave, having frequency f1, of a high-frequency source 9, and that generates a mechanical wave (not depicted) propagating through first crystal 45 and having an acoustic frequency corresponding to frequency f1.

By interaction with the mechanical wave, illuminating light having an illuminating light wavelength associated with the acoustic frequency is deflected into an illumination beam path for illumination of a sample 16. The deflected illuminating light leaves first crystal 45 through an entrance window 50 and travels via a scanning and optical arrangement 51 of a microscope, which in particular contains at least a scanning device and a microscope objective, to sample 16 that is to be lit.

Detected light bundle 18 emerging from sample 16 travels in a reverse light path back to first crystal 45 and enters it through entrance window 50. By interaction with the mechanical wave, a first part 55 of the detected light that has the illuminating light wavelength and a first linear polarization direction is deflected and is thereby removed from detected light bundle 18. The remaining part of detected light bundle 18 exits from the first crystal through exit window 49 and then arrives at entrance window 52 of second crystal 46.

Arranged on second crystal 46 is a second piezo acoustic generator 53 that is likewise impinged upon by an electromagnetic high-frequency wave, having frequency f1, of high-frequency source 9, and that generates a second mechanical wave (not depicted), propagating through second crystal 45, having an acoustic frequency corresponding to frequency f1.

By interaction with the second mechanical wave that propagates in second crystal 46, a second part 56 of the detected light, which has the illuminating light wavelength and a second linear polarization direction perpendicular to the first linear polarization direction, is deflected and is thereby removed from detected light bundle 18. The remaining part of detected light bundle 18 exits from second crystal 46 through exit window 54 and then travels to a detector (not depicted).

The situation such that with acoustic waves having the same acoustic frequency in both crystals 45, 46, both first part 55 of the detected light which has the illuminating light wavelength and a first linear polarization direction, and second part 56 of the detected light which has the illuminating light wavelength and a second linear polarization direction perpendicular to the first linear polarization direction, can be deflected sequentially, is achieved by the fact that crystals 45, 46 are different and are coordinated with one another, in terms of at least one parameter such as crystal cut and/or crystal orientation and/or propagation directions of the mechanical wave and of the light, in such a way that the Bragg condition is respectively satisfied for the light that is to be deflected.

The crystals are embodied and arranged in such a way that the detected light to be delivered to the detector leaves main beam splitter 13 as a collinear light bundle.

Figure 4:
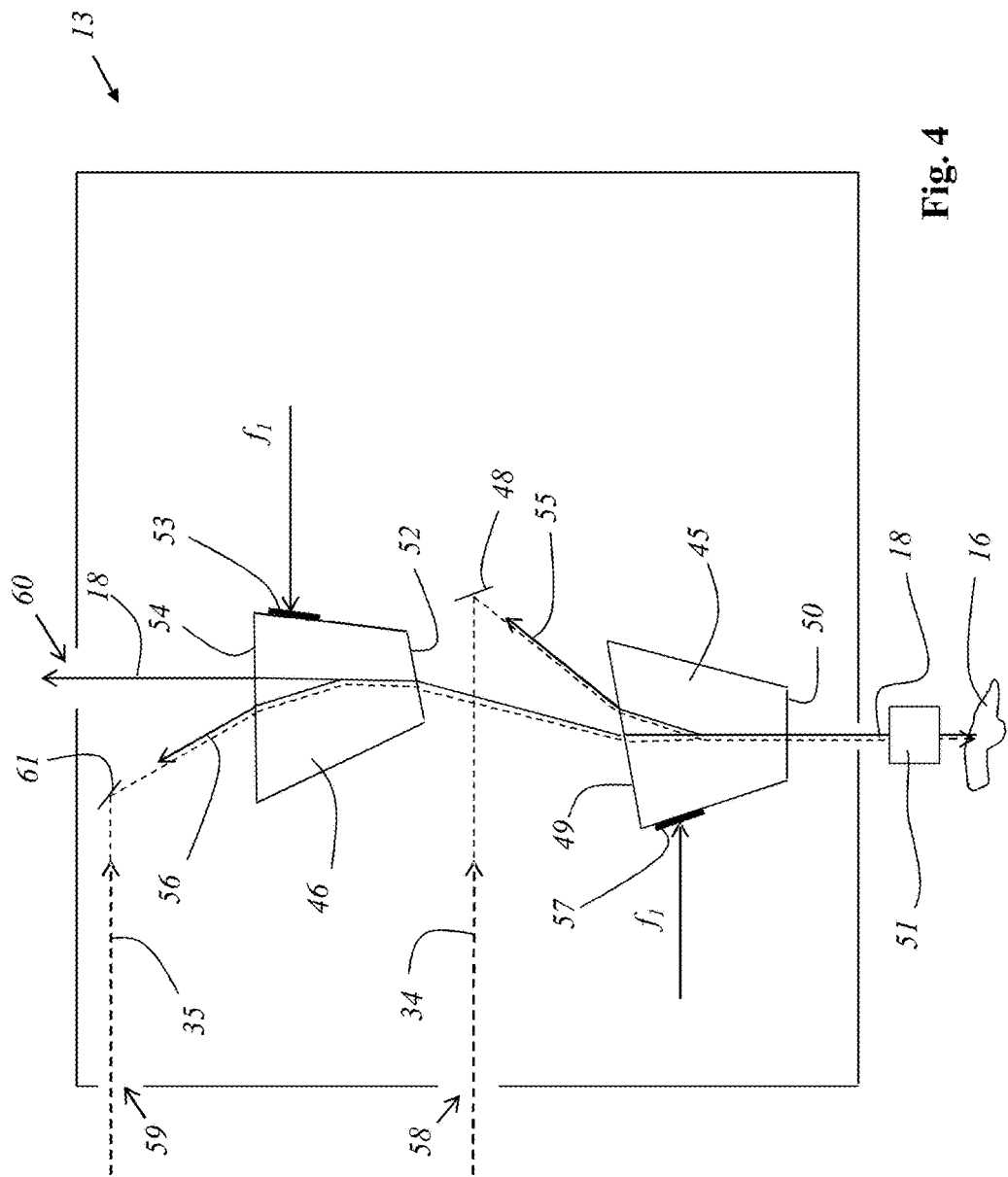
FIG. 4 shows a third exemplifying embodiment of an acousto-optic main beam splitter according to the present invention.

FIG. 4 shows a third exemplifying embodiment of an acousto-optic main beam splitter 13 according to the present invention.

This acousto-optic main beam splitter 13 is substantially similar in construction to main beam splitter 13 depicted in FIG. 3, although a first primary light bundle 33 is coupled in through a first input 58, and a second primary light bundle 35 is coupled in through a second input 59 and via a deflecting mirror 61. First primary light bundle 34 has a first linear polarization direction, while second primary light bundle 35 has a second linear polarization direction perpendicular to the first linear polarization direction. By interaction with the mechanical waves propagating in crystals 45, 46, that portion which has the wavelength associated with the acoustic frequencies is directed out of each of primary light bundles 34, 35 into the illumination beam path for illumination of a sample 16.

The detected light to be delivered to the detector (not depicted) leaves main beam splitter 13 as a collinear light bundle through an output 60.

By modification of the acoustic frequency, portions having another wavelength can be directed into the illumination beam path for illumination of a sample 16.

Figure 5:
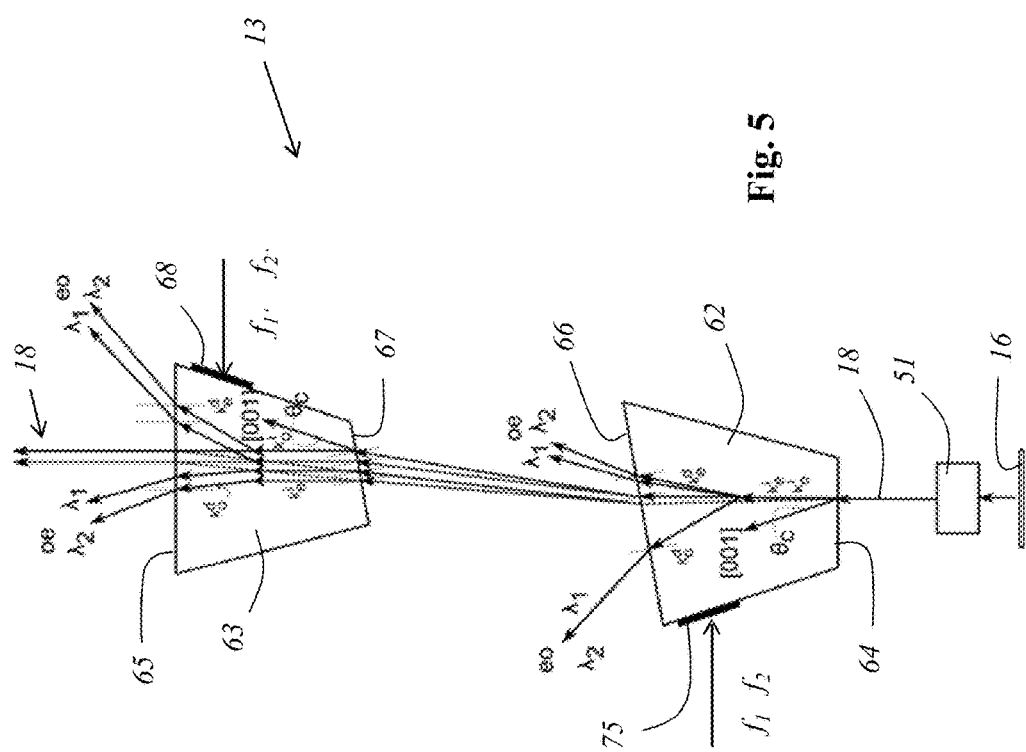
FIG. 5 shows a fourth exemplifying embodiment of an acousto-optic main beam splitter according to the present invention, with reference to processing of the detected light.

FIG. 5 shows a fourth exemplifying embodiment of an acousto-optic main beam splitter 13 according to the present invention, although for better clarity only the progress of the detected light coming from sample 16, and the removal, from the detected light coming from sample 16, of the portions that have the illuminating light wavelengths $\lambda 1$ and $\lambda 2$, are depicted.

Acousto-optic main beam splitter 13 comprises a first crystal 62 on which is arranged a first piezo acoustic generator 75 that is impinged upon by two electromagnetic high-frequency waves having frequencies f1 and f2 and that generates two mechanical waves (not depicted) propagating through first crystal 62, each having an acoustic frequency corresponding to frequencies f1 and f2.

First crystal 62 in terms of its crystal structure, and the propagation directions of the mechanical waves, are oriented relative to one another, and respectively relative to detected light bundle 18 incident into the crystal, in such a way that with the mechanical wave both the portion of detected light bundle 18 having the illuminating wavelengths $\lambda 1$ and $\lambda 2$ and a first linear polarization direction, and the portion of the detected light bundle having the illuminating wavelengths $\lambda 1$ and $\lambda 2$ and a second linear polarization direction perpendicular to the first linear polarization direction, are deflected and are thereby removed from detected light bundle 18.

The removed portions are labeled oe and eo in the Figure. In this exemplifying embodiment the first linear polarization direction is the linear polarization direction of the ordinary light with respect to a birefringence property of crystal 62, while in this exemplifying embodiment the second linear polarization direction is the linear polarization direction of the extraordinary light with respect to a birefringence property of crystal 62. The designations "oe" and "eo" are intended to express the fact that the linear polarization direction of the incident detected light is respectively rotated 90° (from ordinary to extraordinary or vice versa) by interaction with the mechanical waves.

Acousto-optic main beam splitter 13 furthermore comprises a second crystal 63 that receives the remaining detected light emerging from first crystal 62. This detected light is spatially divided both in terms of its polarization and in terms of its wavelength. Second crystal 63 is configured, however, in such a way that detected light bundle 18 emerging from it, which is conveyed to a detector (not depicted), is collinearly combined. This is achieved by the fact that entrance window 64 of first crystal 62 is arranged parallel to exit window 65 of second crystal 63, and that additionally exit window 66 of first crystal 62 is arranged parallel to entrance window 67 of second crystal 63.

Second crystal 63 serves on the one hand to remove portions having illuminating light wavelengths $\lambda 1$ and $\lambda 2$ which possibly still remain in the detected light despite interaction with the mechanical waves of first crystal 62. Second crystal 63 can furthermore serve to furnish a further input for illuminating light to be directed onto the sample (this is not depicted in detail here).

Arranged on second crystal 63 is a second piezo acoustic generator 68, which is impinged upon by two electromagnetic high-frequency waves having frequencies f1' and f2' and generates two mechanical waves (not depicted) propagating through second crystal 63, each having an acoustic frequency corresponding to frequencies f1' and f2'.

Second crystal 63 in terms of its crystal structure, and the propagation directions of the mechanical waves, are oriented relative to one another, and respectively relative to detected light bundle 18 incident into the crystal, in such a way that with the mechanical wave both the portion of detected light bundle 18 having the illuminating wavelengths $\lambda 1$ and $\lambda 2$ and a first linear polarization direction, and the portion of the detected light bundle having the illuminating wavelengths $\lambda 1$ and $\lambda 2$ and a second linear polarization direction perpendicular to the first linear polarization direction, are deflected and are thereby removed from detected light bundle 18.

Figure 6:
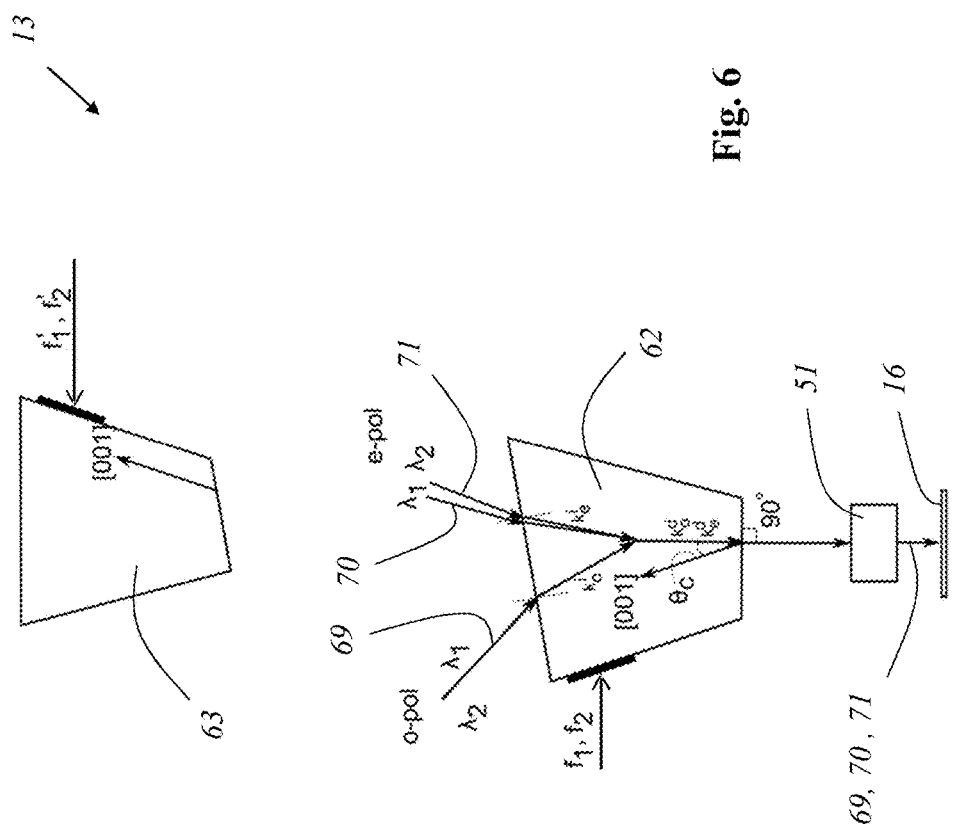
FIG. 6 shows the fourth exemplifying embodiment with reference to direction of the illuminating light.

FIG. 6 shows how illuminating light having the illuminating light wavelengths $\lambda 1$ and $\lambda 2$, which has both a first linear polarization direction and a second linear polarization direction different from the first linear polarization direction, is directed, with acousto-optic main beam splitter 13 already described in detail with reference to FIG. 3, into an illumination beam path for illumination of a sample 16.

In the description that follows, the illuminating light is depicted exclusively via first crystal 62 and through interaction with the mechanical waves (not depicted) propagating in that crystal 62. It is also alternatively or additionally possible, however, to couple in illuminating light via second crystal 63 and to direct it into the illumination beam path for illumination of a sample 16.

The illuminating light is coupled in on a light path on which those portions of the detected light which have the illuminating light wavelengths are removed from detected light bundle 18, as depicted in FIG. 6.

Because of the particular crystal cut of first crystal 62, a first illuminating light bundle 69, which has a first linear polarization direction (labeled "o-pol" in the Figure) and portions having both illuminating light wavelengths $\lambda 1$ and $\lambda 2$, is coupled in as a collinear illuminating light bundle. By interaction with the mechanical waves, the light is directed into an illumination beam path for illumination of a sample 16. It travels via a scanning and optical arrangement 51 of a microscope, which in particular contains at least a scanning device and a microscope objective, to sample 16 that is to be illuminated.

A second illuminating light bundle 70 that has light having the illuminating light wavelength $\lambda 1$ and the second linear polarization direction, as well as a third illuminating light bundle 71 that has light having the illuminating light wavelength $\lambda 2$ and likewise the second linear polarization direction, are also coupled in as spatially separate illuminating light bundles 70, 71. The light of these illuminating light bundles 70, 71 also travels, by interaction with the mechanical waves that propagate in first crystal 62, into the illumination beam path and, via scanning and optical arrangement 51 of a microscope, to sample 16.

Light that does not have the illuminating light wavelength $\lambda 1$ or the illuminating light wavelength $\lambda 2$ is directed not into the illumination beam path but into a beam trap (not depicted).

Figure 7:
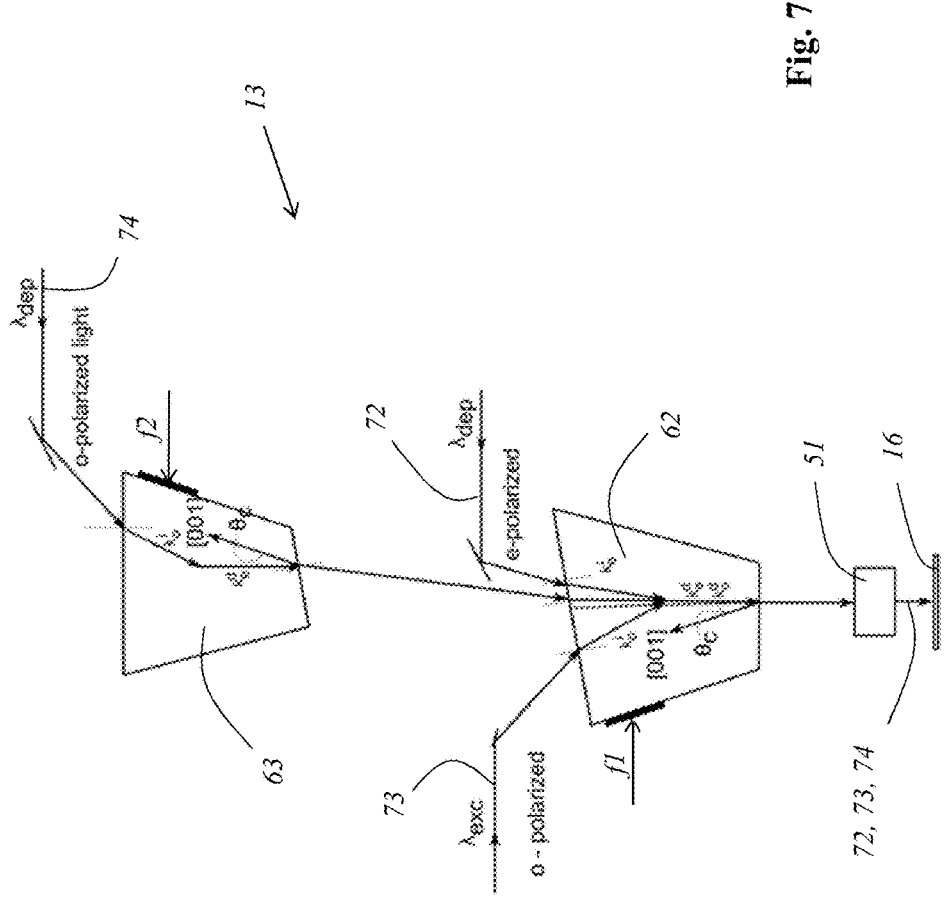
FIG. 7 shows the fourth exemplifying embodiment with reference to a special utilization capability in STED microscopy.

FIG. 7 shows the fourth exemplifying embodiment with reference to a special utilization capability in STED microscopy; only the progress of the illuminating light that impinges upon the sample is depicted, but not, for better clarity, the progress of the detected light.

The resolution capability of a confocal scanning microscope is determined, among other factors, by the intensity distribution and physical extent of the focus of the excitation light bundle in the sample. An arrangement for increasing the resolution capability for fluorescence applications is known from WO 95/21393 A1. Here the lateral edge regions of the focus volume of the excitation light bundle are illuminated with the (optionally, specially shaped) focus of a further light bundle having another wavelength (called the "deexcitation" light bundle), so that the sample regions excited by the excitation light bundle are brought therein back into the ground state in stimulated fashion. Only the spontaneously emitted light from the regions not illuminated by the deexcitation light bundle is then detected, so that an overall improvement in resolution is achieved. The term "stimulated emission depletion" (STED) has become established for this method.

In the exemplifying embodiment depicted in FIG. 7, acousto-optic beam splitter 13 is used to direct both excitation light bundles 72, 74 coming from different directions, each having the wavelength $\lambda_{dep}$ and a different linear polarization, and deexcitation light having the wavelength $\lambda_{exc}$, into an illumination beam path for illumination of a sample 16.

Piezo acoustic generator 75 of first crystal 62 is impinged upon by a high-frequency wave having frequency f1, and generates a mechanical wave (not depicted) propagating through first crystal 62, having an acoustic frequency corresponding to one of frequencies f1.

The excitation light is coupled in via first crystal 62, and the deexcitation light via second crystal 63. The excitation light is coupled in in the form of a first excitation light bundle 72 that comprises a first linear polarization direction (extraordinary linear polarization with respect to the birefringence property of first crystal 62), and a second excitation light bundle 73 that comprises a linear polarization direction (ordinary linear polarization with respect to the birefringence property of first crystal 62) perpendicular to the first linear polarization direction. Both excitation light bundles 72, 73 are deflected by interaction with the mechanical wave and are directed, proceeding coaxially with one another, into the illumination beam path for illumination of sample 16.

Piezo acoustic generator 68 of second crystal 63 is impinged upon by a high-frequency wave having frequency f2, and generates a mechanical wave (not depicted) propagating through second crystal 63 and having an acoustic frequency corresponding to one of frequencies f2. By interaction with this mechanical wave, deexcitation light bundle 74 having the wavelength $\lambda_{dep}$, which has an ordinary linear polarization direction with respect to the birefringence property of second crystal 63, is directed into the illumination beam path and ultimately arrives at sample 16.

It would additionally be possible to couple in a further deexcitation light bundle having a linear polarization direction perpendicular to the linear polarization direction of deexcitation light bundle 74, for example in order to bring about, with the further deexcitation light bundle, stimulated emission in a different sample region than with deexcitation light bundle 74.

In this exemplifying embodiment as well, those portions of the detected light which have the wavelength of the illuminating light are removed, irrespective of their polarization, from the detected light bundle emerging from the sample.

As previously described in detail, however, in this exemplifying embodiment as well those portions which have the wavelength $\lambda_{exc}$ of the excitation light are removed from the detected light bundle coming from the sample.

The invention has been described with reference to a particular embodiment. It is self-evident, however, that modifications and variations can be carried out without thereby departing from the range of protection of the claims hereinafter.

The invention claimed is:

1. An acousto-optic main beam splitter for a scanning microscope, which is embodied and intended to direct illuminating light having a preselected or preselectable illuminating light wavelength into an illumination beam path for illumination of a sample, and to direct detected light coming from a sample into a detection beam path,
   wherein a mechanical wave having an acoustic frequency associated with the illuminating light wavelength propagates, or multiple mechanical waves that have the same acoustic frequency associated with the illuminating light wavelength propagate, in the acousto-optic main beam splitter,
   a. both a portion of the detected light bundle having the illuminating light wavelength and a first linear polarization direction, and a portion of the detected light having the illuminating light wavelength and a second linear polarization direction perpendicular to the first linear polarization direction, being deflected out of the detected light bundle coming from a sample by interaction with the one mechanical wave or by interaction with the mechanical waves, and are thereby removed from the detected light bundle; or
   b. the acousto-optic main beam splitter being embodied to direct, by interaction with the one mechanical wave or by interaction with the mechanical waves, both the portion of illuminating light that has the preselected illuminating light wavelength and a first linear polarization direction, and the portion of illuminating light that has the preselected illuminating light wavelength and a second linear polarization direction that is different from or perpendicular to the first linear polarization direction, into an illumination beam path for illumination of a sample;
   wherein the acousto-optic main beam splitter comprises a first and a second crystal which are arranged in such a way that they are traversed successively by the detected light bundle, the portion having the illuminating light wavelength and the first linear polarization direction being deflected by interaction with a first mechanical wave that has the acoustic frequency and is present in the first crystal, and being thereby removed from the detected light bundle; and the portion having the illuminating light wavelength and the second linear polarization direction being deflected by interaction with a second mechanical wave present in the second crystal, which wave likewise has the acoustic frequency, and being thereby removed from the detected light bundle.

2. The acousto-optic main beam splitter according to claim 1, wherein
   a. the first crystal differs from the second crystal in terms of at least one of shape and size and crystal cut; or
   b. the orientation of the propagation direction of the detected light bundle relative to the lattice structure of the first crystal is different from the orientation of the propagation direction of the detected light bundle relative to the lattice structure of the second crystal; or
   c. the orientation of the propagation direction of the first mechanical wave relative to the lattice structure of the first crystal is different from the orientation of the propagation direction of the second mechanical wave relative to the lattice structure of the second crystal.

3. The acousto-optic main beam splitter according to claim 1, wherein
   a. the detected light bundle passes firstly through the first and then through the second crystal; and by interaction with the mechanical wave of the first crystal, illuminating light having the illuminating light wavelength is directed into an illumination beam path; or
   b. the detected light bundle passes firstly through the first and then through the second crystal; and by interaction with the mechanical wave of the second crystal, illuminating light having the illuminating light wavelength is directed into an illumination beam path.

4. The acousto-optic main beam splitter according to claim 1, wherein the acousto-optic main beam splitter comprises a crystal in which the mechanical wave propagates, the crystal on the one hand and the propagation direction of the mechanical wave on the other hand being oriented, relative to one another and respectively relative to the detected light bundle incident into the crystal, in such a way that the acousto-optic main beam splitter deflects, with the mechanical wave, both the portion of the detected light bundle having the illumination wavelength and a first linear polarization direction, and the portion of the detected light bundle having the illumination wavelength and a second linear polarization direction perpendicular to the first linear polarization direction, and thereby removes them from the detected light bundle.

5. The acousto-optic main beam splitter according to claim 1, wherein a. the first linear polarization direction is the linear polarization direction of the ordinary light with respect to a birefringence property of the crystal; or b. the second linear polarization direction is the linear polarization direction of the extraordinary light with respect to a birefringence property of the crystal; or c. the first or the second linear polarization direction is arranged in the plane that is spanned by the propagation direction of the mechanical wave and the propagation direction of the detected light bundle.

6. The acousto-optic main beam splitter according to claim 1, wherein the beam-guiding components of the main beam splitter are arranged and embodied in such a way that the remaining part of the detected light bundle leaves the acousto-optic main beam splitter collinearly; or the illuminating light bundles having the desired wavelength, irrespective of their polarization direction, are collinearly combined in the illuminating light beam path into which they have been directed.

7. The acousto-optic main beam splitter according to claim 1, wherein the acousto-optic main beam splitter comprises a first and a second crystal; or wherein the acousto-optic main beam splitter comprises a first and a second crystal which are arranged in such a way that they are traversed successively by the detected light bundle, illuminating light that has the illuminating light wavelength and a first linear polarization direction being deflected into the illumination beam path for illumination of a sample by interaction with a first mechanical wave that has the acoustic frequency and is present in the first crystal; and illuminating light that has the illuminating light wavelength and a second linear polarization direction, different from the first linear polarization direction, being deflected into the illumination beam path for illumination of a sample by interaction with a second mechanical wave that has the acoustic frequency and is present in the second crystal.

8. The acousto-optic main beam splitter according to claim 1, wherein a. the acousto-optic main beam splitter is embodied to respectively divide off, by interaction with the mechanical wave propagating in the one crystal, both from a first polychromatic and preferably collinear primary light bundle having a first linear polarization direction and from a second polychromatic and preferably collinear primary light bundle having a second linear polarization direction different from the first linear polarization direction illuminating light having the illuminating light wavelength associated with the frequency of the mechanical wave and to direct it into an illumination beam path for illumination of a sample; or b. the acousto-optic main beam splitter is embodied to direct, by interaction with the mechanical wave propagating in a crystal, both illuminating light that has the illuminating light wavelength and a first linear polarization direction, and illuminating light that has the illuminating light wavelength and a second, other linear polarization direction, into the illumination beam path for illumination of a sample.

9. The acousto-optic main beam splitter according to claim 1, wherein the acousto-optic main beam splitter removes from the detected light bundle, with multiple mechanical waves that are respectively characterized by different acoustic frequencies, portions of illuminating light that is at least one of scattered and reflected at a sample and has multiple illuminating light wavelengths associated with the acoustic frequencies.

10. The acousto-optic main beam splitter according to claim 1, wherein the acousto-optic main beam splitter comprises a first and a second crystal, such that a. portions of illuminating light that is at least one of scattered and reflected at a sample and has a first linear polarization direction, and has multiple illuminating light wavelengths associated with the acoustic frequencies, are simultaneously deflected out of the detected light bundle in the first crystal with multiple mechanical waves that are each characterized by different acoustic frequencies associated with different illuminating light wavelengths; and such that b. portions of illuminating light that is at least one of scattered and reflected at a sample and has illuminating light wavelengths associated with the acoustic frequencies, and has a second linear polarization direction different from the first linear polarization direction, are simultaneously deflected out of the detected light bundle in the second crystal with multiple mechanical waves that have the same acoustic frequencies as the mechanical waves of the first crystal.

11. The acousto-optic main beam splitter according to claim 1, wherein multiple mechanical waves that are each characterized by different acoustic frequencies associated with different illuminating light wavelengths propagate simultaneously in the main beam splitter or in a crystal of the main beam splitter, each of the mechanical waves respectively deflecting both the portion having the illuminating light wavelength associated with its frequency and having a first linear polarization direction, and the portion having a second linear polarization direction perpendicular to the first linear polarization direction, and thereby removing them from the detected light bundle.

12. The acousto-optic main beam splitter according to claim 1, wherein the mechanical waves of a crystal of the acousto-optic beam splitter have the same propagation direction or are generated by the same acoustic generator.

13. The acousto-optic main beam splitter according to claim 1, wherein a. with multiple mechanical waves that have different acoustic frequencies, the acousto-optic main beam splitter divides off, from polychromatic primary light, illuminating light having multiple illuminating light wavelengths and directs it into an illumination beam path for illumination of a sample; or b. with multiple mechanical waves that have different acoustic frequencies, the acousto-optic main beam splitter divides off, from a polychromatic and collinear primary light bundle, illuminating light of multiple illuminating light wavelengths and directs it into an illumination beam path for illumination of a sample; or c. with multiple mechanical waves that have different acoustic frequencies, the acousto-optic main beam splitter respectively divides off, both from a first polychromatic and preferably collinear primary light bundle of at least one light source having a first linear polarization direction, and from a second polychromatic and preferably collinear primary light bundle of at least one light source having a second linear polarization direction perpendicular to the first linear polarization direction, illuminating light having several wavelengths and directs it into an illumination beam path for illumination of a sample, the frequency of the respective mechanical wave being respectively associated with one of the illuminating light wavelengths.

14. An acousto-optic main beam splitter for a scanning microscope, which is embodied and intended to direct illuminating light having a preselected or preselectable illuminating light wavelength into an illumination beam path for illumination of a sample, and to direct detected light coming from a sample into a detection beam path, wherein a mechanical wave having an acoustic frequency associated with the illuminating light wavelength propagates, or multiple mechanical waves that have the same acoustic frequency associated with the illuminating light wavelength propagate, in the acousto-optic main beam splitter, a. both a portion of the detected light bundle having the illuminating light wavelength and a first linear polarization direction, and a portion of the detected light having the illuminating light wavelength and a second linear polarization direction perpendicular to the first linear polarization direction, being deflected out of the detected light bundle coming from a sample by interaction with the one mechanical wave or by interaction with the mechanical waves, and are thereby removed from the detected light bundle; or b. the acousto-optic main beam splitter being embodied to direct, by interaction with the one mechanical wave or by interaction with the mechanical waves, both the portion of illuminating light that has the preselected illuminating light wavelength and a first linear polarization direction, and the portion of illuminating light that has the preselected illuminating light wavelength and a second linear polarization direction that is different from or perpendicular to the first linear polarization direction, into an illumination beam path for illumination of a sample;

and wherein c. the acousto-optic main beam splitter or a crystal of the main beam splitter comprises a first input for a first primary light bundle having a first linear polarization direction, from which illuminating light having the preselected or preselectable wavelength can be divided off for illumination of a sample, and a second input for a second primary light bundle having a second, other linear polarization direction, from which illuminating light having the preselected or preselectable wavelength can be divided off for illumination of a sample; or d. the acousto-optic main beam splitter comprises a polarizing beam splitter for spatial division of a primary light bundle into a first portion having a first linear polarization direction and a second portion having a second, other linear polarization direction.

15. The acousto-optic main beam splitter according to claim 14, wherein the illuminating light directed into the illumination beam path leaves the acousto-optic main beam splitter or a crystal of the acousto-optic main beam splitter as a collinear illuminating light bundle.

16. The acousto-optic main beam splitter according to claim 1, wherein a. a crystal of the acousto-optic main beam splitter through which the mechanical wave propagates comprises an entrance surface for the detected light; or b. a crystal of the acousto-optic main beam splitter through which the mechanical wave propagates comprises an entrance surface for the detected light through which the detected light is incident at an incidence angle of zero degrees; or c. a crystal of the acousto-optic main beam splitter through which the mechanical wave propagates comprises an exit surface for the detected light; or d. a crystal of the acousto-optic main beam splitter through which the mechanical wave propagates comprises an exit surface for the detected light through which the detected light leaves the crystal at a return angle of zero degrees; or e. a crystal of the acousto-optic main beam splitter through which the mechanical wave propagates comprises an entrance surface and an exit surface, oriented parallel thereto, for the detected light.

17. The acousto-optic main beam splitter according to claim 1, wherein two crystals are disposed serially in such a way that they are traversed successively by the detected light emerging from the sample; and the entrance window of the first crystal is arranged parallel to the exit window of the second crystal; and additionally the exit window of the first crystal is arranged parallel to the entrance window of the second crystal.

18. The acousto-optic main beam splitter according to claim 1, wherein a. a crystal of the acousto-optic main beam splitter through which the mechanical wave propagates comprises at least one entrance surface for the primary light of at least one light source; or b. a crystal of the acousto-optic main beam splitter through which the mechanical wave propagates comprises at least one entrance surface for the primary light of at least one light source, which at the same time is the exit surface for the detected light; or c. a crystal of the acousto-optic main beam splitter through which the mechanical wave propagates comprises an exit surface for the illuminating light which at the same time is the entrance surface for the detected light; or d. a crystal of the acousto-optic main beam splitter through which the mechanical wave propagates comprises an entrance surface for primary light of at least one light source and an exit surface for the divided-off illuminating light, which are oriented with respect to one another in such a way that the illuminating light deflected with the mechanical wave encounters the exit surface at an incidence angle of zero degrees; or e. a crystal of the acousto-optic main beam splitter through which the mechanical wave propagates comprises an entrance surface for primary light of at least one light source and an exit surface for the divided-off illuminating light, which are oriented with respect to one another in such a way that the primary light is couplable into the crystal as a collinear primary light bundle, and the illuminating light deflected with the mechanical wave leaves the crystal as a collinear illuminating light bundle.

19. The acousto-optic main beam splitter according to claim 1, wherein a. the acousto-optic main beam splitter comprises at least one dispersive optical component that compensates for a spatial color division, produced (at least in part) by a crystal of the acousto-optic main beam splitter through which the mechanical wave propagates, of at least one of the primary light and of the illuminating light and of the detected light; or b. the acousto-optic main beam splitter comprises at least one dispersive optical component that compensates for a spatial color division, produced (at least in part) by a crystal of the acousto-optic main beam splitter through which the mechanical wave propagates, of at least one of the primary light and of the illuminating light and of the detected light, and that has multiple entrance surfaces; or c. the acousto-optic main beam splitter comprises at least one dispersive optical component that compensates for a spatial color division, produced (at least in part) by a crystal of the acousto-optic main beam splitter through which the mechanical wave propagates, of at least one of the primary light and of the illuminating light and of the detected light, and that has a first entrance surface for light having a first linear polarization direction and a second entrance surface for light having a second linear polarization direction perpendicular to the first linear polarization direction.

20. A microscope or a scanning microscope or a confocal scanning microscope having an acousto-optic main beam splitter according to claim 1.

* * * * *